United States Patent
Liu

(10) Patent No.: US 8,012,544 B2
(45) Date of Patent: Sep. 6, 2011

(54) SILICONE MQ RESIN REINFORCED SILICONE ELASTOMER EMULSIONS

(75) Inventor: Yihan Liu, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 176 days.

(21) Appl. No.: 12/393,262

(22) Filed: Feb. 26, 2009

(65) Prior Publication Data

US 2009/0226623 A1    Sep. 10, 2009

Related U.S. Application Data

(63) Continuation-in-part of application No. 10/571,975, filed as application No. PCT/US2004/020198 on Jun. 23, 2004, now abandoned.

(60) Provisional application No. 60/509,674, filed on Oct. 8, 2003.

(51) Int. Cl.
*B05D 3/02* (2006.01)
*C08L 83/04* (2006.01)

(52) U.S. Cl. ........................ 427/387; 524/500

(58) Field of Classification Search .................. 524/588, 524/500; 427/387
See application file for complete search history.

(56) References Cited

U.S. PATENT DOCUMENTS

| | | | |
|---|---|---|---|
| 4,221,688 A | 9/1980 | Johnson et al. | |
| 4,224,849 A | 9/1980 | Loser | |
| 4,427,811 A | 1/1984 | Elias et al. | |
| 4,496,687 A * | 1/1985 | Okada et al. | 524/859 |
| 4,535,109 A | 8/1985 | Kondo et al. | |
| 4,554,187 A | 11/1985 | Grape et al. | |
| 4,618,642 A | 10/1986 | Schoenherr | |
| 4,620,878 A | 11/1986 | Gee | |
| 4,661,556 A | 4/1987 | Huebner et al. | |
| 4,677,160 A | 6/1987 | Kondo et al. | |
| 4,769,405 A * | 9/1988 | Kondo et al. | 524/35 |
| 4,816,506 A | 3/1989 | Gamon et al. | |
| 4,824,890 A | 4/1989 | Glover et al. | |
| 4,833,187 A | 5/1989 | Sittenthaler et al. | |
| 4,940,743 A | 7/1990 | Grape et al. | |
| 5,004,771 A | 4/1991 | Feder et al. | |
| 5,045,231 A | 9/1991 | Braun et al. | |
| 5,140,061 A | 8/1992 | Feder | |
| 5,145,907 A | 9/1992 | Kalinowski et al. | |
| 5,162,429 A | 11/1992 | Burns et al. | |
| 5,234,495 A | 8/1993 | Breneman et al. | |
| 5,246,694 A | 9/1993 | Birthwistle | |
| 5,302,658 A | 4/1994 | Gee et al. | |
| 5,319,120 A | 6/1994 | Gilson et al. | |

(Continued)

FOREIGN PATENT DOCUMENTS

JP    59-100170    6/1984

(Continued)

*Primary Examiner* — Robert Loewe
(74) *Attorney, Agent, or Firm* — Alan Zombeck

(57) ABSTRACT

An aqueous silicone emulsion forms a resin reinforced elastomeric film upon water evaporation. The emulsion composition contains a dispersed phase consisting of a silicone mixture composed of (i) a linear hydroxy terminated polydiorganosiloxane, (i) a silicone MQ resin, and (iii) an organofunctional polysiloxane. The aqueous silicone emulsion is prepared by mixing ingredients (i) to (iii) to form a mixture, adding emulsifiers and water to the mixture, mixing the ingredients to obtain an aqueous base emulsion, adjusting the pH of the base emulsion to an acidic or basic pH to facilitate crosslinking, and subsequently neutralizing the emulsion. Elastomeric films can be obtained by drying the emulsion on a substrate at ambient conditions.

6 Claims, 2 Drawing Sheets

Dynamic shear modulus measured of films dried from emulsions D(▽), E(◇), F(○), G(●), H(■) and H(b)(▲).

U.S. PATENT DOCUMENTS

| | | | |
|---|---|---|---|
| 5,321,075 A | 6/1994 | Liles | |
| 5,326,483 A | 7/1994 | Halloran et al. | |
| 5,531,812 A | 7/1996 | Montigny et al. | |
| 5,710,113 A | 1/1998 | Wells | |
| 5,723,521 A | 3/1998 | Cook et al. | |
| 5,741,876 A | 4/1998 | Carpenter, II et al. | |
| 5,851,594 A | 12/1998 | Feder et al. | |
| 5,895,794 A * | 4/1999 | Berg et al. | 523/217 |
| 5,968,660 A | 10/1999 | Armstrong et al. | |
| 5,973,061 A | 10/1999 | Feder et al. | |
| 5,998,536 A | 12/1999 | Bertry et al. | |
| 6,054,523 A | 4/2000 | Braun et al. | |
| 6,180,117 B1 | 1/2001 | Berthiaume et al. | |
| 6,201,063 B1 | 3/2001 | Halloran et al. | |
| 6,235,834 B1 | 5/2001 | Gee et al. | |
| 6,294,608 B1 * | 9/2001 | Hager et al. | 524/838 |
| 6,323,268 B1 | 11/2001 | Fisher et al. | |
| 6,340,662 B1 | 1/2002 | Millhoff et al. | |
| 6,521,699 B2 * | 2/2003 | Feder et al. | 524/588 |
| 6,545,086 B1 | 4/2003 | Kosal | |
| 6,737,444 B1 | 5/2004 | Liu | |
| 6,939,925 B2 | 9/2005 | Sakamoto et al. | |
| 6,995,210 B2 * | 2/2006 | Bouvy et al. | 524/837 |

FOREIGN PATENT DOCUMENTS

| | | |
|---|---|---|
| WO | WO 99/25757 | 5/1999 |

* cited by examiner

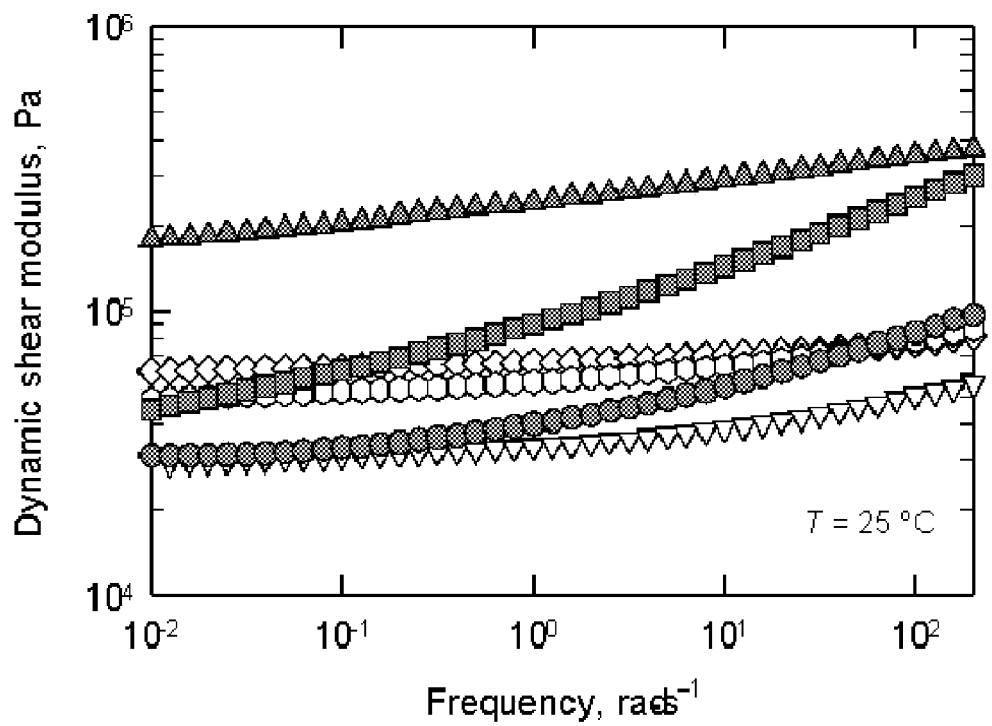
Figure 1. Dynamic shear modulus measured of films dried from emulsions D(▽), E(◇), F(○), G(●), H(■) and H(b)(▲).

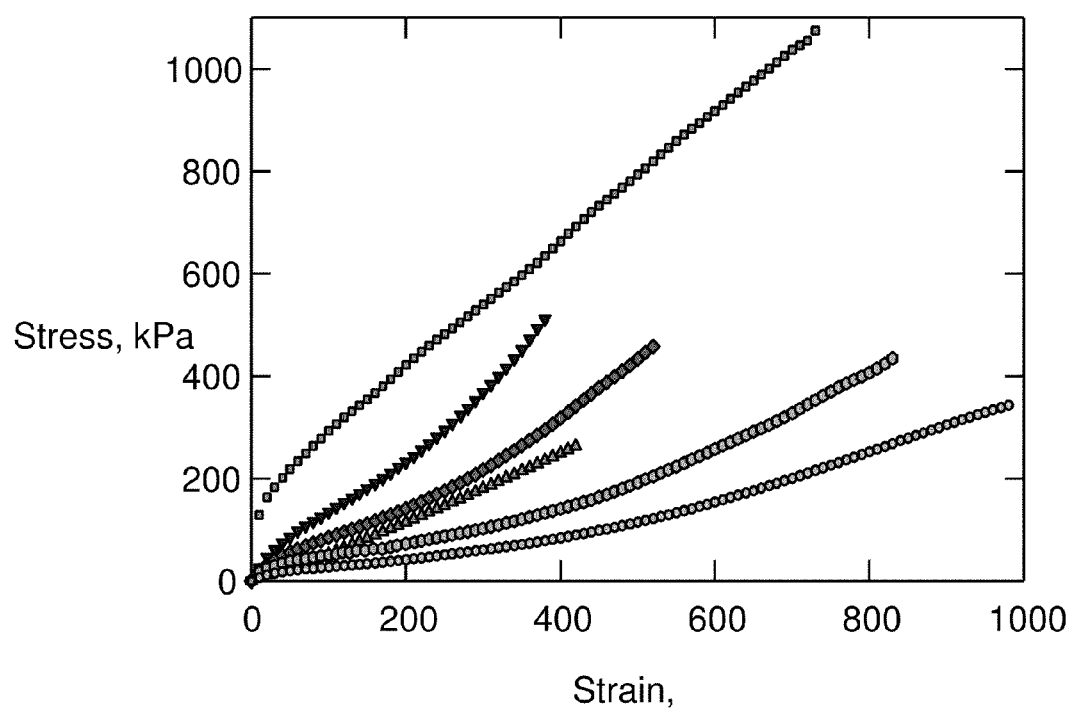
Figure 2. Tensile stress measured of films dried from emulsions D(▲), E(▼), F(◆), G(●), H(●) and H(b)(■).

US 8,012,544 B2

SILICONE MQ RESIN REINFORCED SILICONE ELASTOMER EMULSIONS

CROSS REFERENCE TO RELATED APPLICATIONS

This application is a continuation in part of U.S. application Ser. No. 10/571,975 filed Mar. 15, 2006 now abandoned. U.S. application Ser. No. 10/571,975 was a national stage filing under 35 U.S.C. §371 of PCT Application No. PCT/US2004/020198 filed on Jun. 23, 2004, which claimed the benefit of U.S. Provisional Patent Application No. 60/509,674 filed Oct. 8, 2003 under 35 U.S.C. §119 (e). U.S. application Ser. No. 10/571,975, PCT Application No. PCT/US2004/020198 and U.S. Provisional Patent Application No. 60/509,674 are hereby incorporated by reference.

FIELD OF THE INVENTION

This invention is related to an aqueous silicone emulsion capable of forming a resin reinforced elastomer upon evaporation of the water. In particular, the dispersed phase of the emulsion contains the crosslinked product of (i) a linear hydroxy terminated polydiorganosiloxane, (ii) a silicone MQ resin, and (iii) an organofunctional polysiloxane. The process for preparing the emulsion is carried out by mixing the three silicone ingredients (i) to (iii), and then emulsifying the mixture to obtain an aqueous base emulsion. The pH of the aqueous base emulsion is then adjusted to facilitate crosslinking, and it is subsequently neutralized. Such emulsions, as well as films of resin reinforced elastomers produced from such emulsions by evaporation, possess several advantages over emulsions typical of the prior art which often contain colloidal silica and reactive organosilanes as crosslinking agents, as their primary sources of reinforcement. For example, compositions of this invention provide good polymer and emulsion stability, uniform reinforcement, and they are free of volatile organic compounds and metal catalysts, typically present in emulsions in the prior art.

BACKGROUND

Aqueous silicone dispersions cross linkable upon drying onto substrates into elastomeric films are known in the art. One type uses polydiorganosiloxanes as the primary ingredient, which is cross linkable through condensation and water removal. Such dispersions typically contain (i) an oil-in-water (O/W) emulsion of a hydroxy group containing polydiorganosiloxane such as an $\alpha,\omega$-dihydroxypolydimethylsiloxane, (ii) a condensation catalyst, (iii) a crosslinking agent, and (iv) an optional non-siliceous inorganic filler. Condensation catalysts most preferred are organo-metallic compounds such as dialkyltindicarboxylates. These hydroxy endblocked polydiorganosiloxane emulsions are generally produced by mechanically emulsifying pre-polymerized linear silicones with anionic and/or nonionic surfactants, or by means of emulsion polymerization of linear or cyclic oligomer siloxanes in anionic surfactant containing acidic systems.

The mechanism used for crosslinking generally falls into three main categories. In the first category, colloidal silica or an alkaline metal silicate is used as the crosslinking agent, and it is combined with an organic metal catalyst, as well as a high pH in the aqueous dispersion, to crosslink the polymer into an elastomer. In the second category, an alkoxysilane is used as the crosslinking agent, and the emulsion is filled with silica or a non-siliceous filler. In the third category, reactive silicone resins or metal siliconates are used to reinforce and/or crosslink an hydroxy endblocked polydiorganosiloxane.

Category one dispersions based on colloidal silica or silicates as crosslinking agents have inherent problems of limited shelf life. Certain measures can be taken to partially overcome this problem such as by aging the emulsion or by using divalent tin catalysts. Nevertheless, the storage stability problem is difficult to solve since neutral emulsions are not stable on storage, and do not cure to an elastomer after storage. The best-known technical solution involves storing the dispersions at a high pH, but high pHs can often be incompatible in certain applications. In addition, organic metal catalysts such as organic tin salts are necessary in curing the elastomeric film upon drying, and the presence of a metal catalyst is not always desirable in many final applications. Another inherent problem associated with dispersions containing colloidal silica or alkaline metal silicates is that the silica may agglomerate upon drying of the emulsion, forming an inhomogeneous film with inferior mechanical properties. Furthermore, there is evidence showing that silica particles in such dispersions reside at the silicone-water interface, with the result that there is less efficient crosslinking and reinforcing of the silicone than otherwise would be the case if the silica were distributed within the oil phase.

Category two dispersions necessarily produce an alcohol as a by-product volatile component. As a result, if significant amounts of alkoxysilane are incorporated, applications of the dispersion can be very limited. In addition, the alkoxysilanes are typically added to the aqueous phase, and have been shown to induce gelation of the emulsion if not added carefully.

In category three, the silicone resins or siliconates in such dispersions typically possess $D(R_2SiO_{2/2})$ units and $T(RSiO_{3/2})$ units, or $M(R_3SiO_{1/2})$ units, D units and T unit constructions. In rare instances when a silicone resin containing M and $Q(SiO_{4/2})$ units is used, it is generally in the form of a solution in toluene, again limiting their use in the market place. Alternatively when a Q unit containing resin is used, it often is a low molecular weight oligomer, e.g., a tetra-functional silane hydrolyzate, such that the resin can be solubilized in water and thus be incorporated into the emulsion as an aqueous solution or added directly to the aqueous continuous phase of the emulsion. The latter is exemplified in U.S. Pat. No. 6,521,699.

Emulsions according to this invention differ from known compositions in that they are prepared with silicone MQ resins for the crosslinking and the reinforcing of the linear hydroxy terminated polydiorganosiloxane in the formation of silicone MQ resin reinforced elastomeric films upon evaporation of water from the emulsion. These emulsions also contain large portions of silicone MQ resins and are free of metal containing catalysts. The compositions according to the invention provide many advantages including (i) good polymer stability both in the emulsion droplets and in the drying film, (ii) the crosslinking occurs sufficiently quickly into an elastomeric film by water evaporation under ambient conditions, (iii) dried films are macroscopically and microscopically homogeneous since the compositions undergo crosslinking and reinforcement via silicone MQ resins instead of via discrete silica particles, (iv) crosslinking and reinforcement occurs throughout the silicone oil phase and there is no domain segregation yielding intrinsically superior mechanical properties, (v) the emulsion is free of volatile organic compounds, (vi) the use of metal containing catalysts is eliminated, and (vii) it possesses a wide range of resin-to-linear ratio yielding a wide range of mechanical properties in the final product.

BRIEF SUMMARY OF THE INVENTION

The invention is directed to a method of making an aqueous silicone emulsion containing a crosslinked silicone elastomer. The emulsion is prepared by combining and mixing (i) a linear hydroxy terminated polydiorganosiloxane, (ii) a silanol containing silicone MQ resin, and (iii) an organofunctional polysiloxane to form a silicone mixture; adding at least one emulsifier and water to the silicone mixture and mixing to obtain an aqueous silicone base emulsion; adding a sufficient amount of an acidic or basic compound to the aqueous silicone base emulsion in order to adjust the pH of the aqueous silicone base emulsion to an acidic or basic pH necessary to facilitate condensation and crosslinking of the linear hydroxy terminated polydiorganosiloxane and the silanol containing silicone MQ resin in forming a crosslinked silicone elastomer; and neutralizing the aqueous silicone emulsion containing the crosslinked silicone elastomer. The aqueous silicone emulsion can be applied to substrate and dried under ambient conditions to obtain an elastomeric silicone film.

These and other features of the invention will become apparent from a consideration of the detailed description.

BRIEF DESCRIPTION OF THE DRAWINGS

FIG. 1. Dynamic shear modulus measured of films dried from emulsions.

FIG. 2. Tensile stress measured of films dried from emulsions.

DETAILED DESCRIPTION OF THE INVENTION

The aqueous silicone emulsion according to the invention is prepared by first forming a water-insoluble homogeneous silicone oil phase containing (i) a linear hydroxy terminated polydiorganosiloxane, (ii) a silicone MQ resin, and (iii) an organofunctional polysiloxane. The dispersed silicone oil phase containing ingredients (i) to (iii) is mixed to form a silicone mixture. Emulsifiers and water are added to the silicone mixture, the ingredients are mixed to obtain an aqueous base emulsion, the pH of the base emulsion is adjusted to an acidic or basic pH to facilitate crosslinking, and the emulsion is neutralized. Elastomeric films are obtained by drying the emulsion on a substrate under ambient conditions.

Generally, the aqueous base emulsion is prepared in the manner and by the process described in detail in copending U.S. patent application Ser. No. 10/346,544, filed Jan. 16, 2003, entitled "Method of Making Silicone Resin Emulsions", assigned to the same assignee as the present invention, and hereby incorporated by reference (the '544 application). While the copending application describes the method of making the aqueous base emulsion, it does not teach or suggest the concept of the present invention, i.e., adjusting the pH of the aqueous base emulsion to an acidic or basic pH to facilitate crosslinking, neutralizing the emulsion, and obtaining an elastomeric film by drying the emulsion on a substrate under ambient conditions.

In this regard, it should be noted that the mechanism of crosslinking in order to form elastomers is initiated and/or catalyzed by addition of an acid or a base compound to the aqueous base emulsion. Upon addition of an acid or a base compound, the silanol groups present on the silicone MQ resin, and the silanol groups present on the linear hydroxy terminated polydiorganosiloxane, condense with one another and crosslink the silicone MQ resin with the linear hydroxy terminated polydiorganosiloxane to form an elastomeric silicone.

The aqueous silicone emulsion according to the invention is an oil-in-water (O/W) emulsion. The oil phase of the aqueous silicone (O/W) emulsion is a mixture of (i) 1-95 parts by weight, preferably 40-90 parts by weight, of a linear hydroxy terminated polydiorganosiloxane, (ii) 5-60 parts by weight, preferably 10-40 parts by weight, of a silanol group containing silicone MQ resin, and (iii) 0.1-30 parts by weight, preferably 0.5-20 parts by weight, of an organofunctional polysiloxane. To arrive at an elastomeric film of strength, component (ii) should be at least 40 parts per 100 parts of component (i).

The linear hydroxy terminated polydiorganosiloxane is an $\alpha,\omega$-dihydroxypolydiorganosiloxane in which the organic groups can be monovalent hydrocarbon groups or functionally substituted hydrocarbon groups containing 1-18 carbon atoms, preferably 1-6 carbon atoms. The organic groups are common organic groups such as monovalent substituted and unsubstituted alkyl groups and aryl groups such as methyl, ethyl, propyl, 3,3,3-trifluoropropyl, and phenyl. Preferably, at least 80 percent of the organo groups are methyl groups. The linear hydroxy terminated polydiorganosiloxane can have a viscosity of 0.65-100,000 centistoke ($mm^2/s$), preferably 30-10,000 centistoke ($mm^2/s$).

The acronym MQ as used herein is derived from four symbols M, D, T, and Q, which represent the functionality of structural units present in organosilicon compounds containing siloxane units joined by $\equiv$Si—O—Si$\equiv$ bonds. The monofunctional (M) unit represents $R_3SiO_{1/2}$; the dysfunctional (D) unit represents $R_2SiO_{2/2}$; the trifunctional (T) unit represents $RSiO_{3/2}$ and results in the formation of branched linear siloxanes; and the tetrafunctional (Q) unit represents $SiO_{4/2}$ which results in the formation of crosslinked and resinous compositions. R represents a monovalent organic group, preferably a hydrocarbon group such as methyl. Hence, MQ is used when the siloxane contains all monofunctional M units and tetrafunctional Q units, or a high percentage of M and Q units such as to render it resinous.

The silicone MQ resin according to the invention is a silanol group containing resin of the structure $M_xQ_y$ where M represents the $R_3SiO_{1/2}$ unit and Q represents the $SiO_{4/2}$ unit, and wherein R is hydroxy, a monovalent hydrocarbon group, or a functionally substituted hydrocarbon group having 1-6 carbon atoms, preferably the methyl group. The letters x and y represent numbers, and the ratio of x:y is 0.5-2, with the proviso that there is on average at least 3 hydroxy groups attached to the silicon atom in the M units per resin molecule. The silanol content in the MQ resin should be 0.5 to 5 wt % of hydroxyl (—OH) per resin molecule. The resin can be liquid or solid at room temperature, but the weight average molecular weight (Mw) should be from 2,000 to 50,000, which renders the MQ resin water insoluble. Water insoluble here means that the solubility is less than 1 wt %.

The organofunctional polysiloxane is a composition of the general formula $(R^1_3SiO_{1/2})_a(R^2_2SiO_{2/2})_b(R^3SiO_{3/2})_c$, wherein $R^1$, $R^2$, and $R^3$ are the same or different hydrocarbon or organofunctional substituted hydrocarbon groups having 1-18 carbon atoms, preferably 1-6 carbon atoms; provided that at least one organofunctional substituted hydrocarbon group is present and attached to a silicon atom in the molecule, and that the organofunctional substituted hydrocarbon group is selected from the group consisting of an amino group, an epoxidized amino group, a quaternary ammonium group, a glycidyl group, a mercapto group, a carboxyl group, a polyoxyethylene oxypropylene group, a sulfonate group or combinations thereof. The values of a are 0-100, b is 0-1,000, and c is 0-100, provided that at least two of a-c are not zero and the resulting composition is a fluid at room temperature.

Some examples of suitable organofunctional groups are amino groups such as $\equiv SiCH_2CH_2CH_2NH_2$, epoxidized amino groups such as $\equiv SiC_4H_8NRC_2H_4NR_2$ where R is about 20 percent hydrogen and about 80 percent of the group $-CH_2CH(OH)CH_2OH$; glycidyl groups such as $\equiv Si(CH_2)_3OCH_2CH(O)CH_2$, polyoxyethylene oxypropylene groups such as $\equiv Si(CH_2)_3(OCH_2CH_2)_{10}[OCH_2(CH_3)CH]_4OC(O)CH_3$, carboxyl groups such as $\equiv Si(CH_2)_3COOH$, mercapto groups such as $\equiv Si(CH_2)_3SH$, and quaternary ammonium groups such as $\equiv SiC_4H_8NHC_2H_4NHCH_2CH(OH)CH_2N^+(CH_3)_3Cl^-$.

One particularly preferred organofunctional polysiloxane according to the invention is an amino functional polysiloxane fluid of the structure:

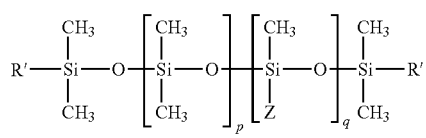

wherein R' can be hydroxyl, a methyl group, or another hydrocarbon or functionally substituted hydrocarbon group having 1-18 carbon atoms; Z is an aminoethylaminopropyl group or an aminoethylaminoisobutyl group; p and q represent integers of 1-1,000 provided that q/p is 0.02-0.1. An especially useful aminofunctional polysiloxane is a fluid of the above structure wherein some amine hydrogen atoms are substituted with an epoxy functional group.

The ratio between the amount of the linear hydroxy terminated polydiorganosiloxane and the silicone MQ resin used will determine the final properties of the silicone elastomer. However, there should be at least 40 parts of component (ii) per 100 parts of component (i). The desired spectrum of properties can be varied over a broad range, depending on the ratio of linear hydroxy terminated polydiorganosiloxane to silicone MQ resin. For example, an increasing level of silicone MQ resin leads to an increasingly rigid film having a short elongation at break, a high modulus of elasticity, and a high tensile strength, most suitable in coating applications. In contrast, a low silicone MQ resin content leads to films which have a long elongation at break, a low modulus, and a low tensile strength, which when combined with a suitable filler, can be used as a sealant.

Therefore, one of the main advantages of the present invention is that a broad application spectrum can be obtained by simply varying the mixing ratio between the linear hydroxy terminated polydiorganosiloxane and the silicone MQ resin. Some useful and practical proportions and/or ratios of linear hydroxy terminated polydiorganosiloxane to silicone MQ resin have been determined to be 90:10 to 40:60. Higher content of the silicone MQ resin is possible so long as the mixture is in a flowable state suitable for emulsification.

In this regard, it should be noted that the relative amount of the organofunctional polysiloxane being used should be maintained at a level sufficient to aid inversion during the process of emulsification according to the method described in the '544 application, but no more than is necessary, for economic reasons. Thus, when the ratio of silicone MQ resin to linear hydroxy terminated polydiorganosiloxane is low, i.e., less than 0.2, it may not be necessary to include the organofunctional polysiloxane solely for the purpose of easing emulsification. The choice in type of organofunctional polysiloxane and its amount should be in accordance with the desired properties of the aqueous silicone emulsion, as well as the desired properties of the resulting elastomeric silicone film being produced. This is an additional advantage of the present invention, in that one is enabled to select a type of organofunctional group in order to provide a silicone MQ resin reinforced organofunctional silicone elastomer particularly suited for targeted applications.

It is to be pointed out that the linear hydroxy terminated polydiorganosiloxane (i), the silicone MQ resin (ii), and the organofunctional polysiloxane (iii) should be mixed to form a homogenous oil phase prior to emulsification. As such all three components should be either miscible or dispersable with each other and be each water insoluble. Otherwise emulsification to form a stable oil-in-water emulsion is difficult to achieve. Water insoluble here means that the solubility is less than 1 wt %.

While the range of emulsifiers suitable for use herein can include anionic, cationic, nonionic, amphoteric, and mixtures thereof, it is most preferred to use a mixture consisting of two nonionic surfactants in which one nonionic surfactant has a low HLB (Hydrophile-Lipophile Balance) and the other nonionic surfactant has a high HLB, such that the combined HLB is 11.0-16.0. Some suitable nonionic surfactants include the condensates of ethylene oxide having long chain fatty alcohol groups or fatty acid groups such as $C_{12-16}$ alcohol moieties; condensates of ethylene oxide with amines or amides; condensation products of ethylene and propylene oxides; esters of glycerol, sucrose or sorbitol; fatty acid alkylol amides; sucrose esters; polysiloxane polyoxyalkylene copolymers; fluoro-type surfactants; fatty amine oxides. The most suitable nonionic surfactants include the ethoxylated alcohols sold under the trademark TERGITOL® by The Dow Chemical Company, Midland, Mich. Some examples include TERGITOL® TMN-6 which is an ethoxylated alcohol also known as ethoxylated trimethylnonanol, and TERGITOL® 15-S-15 which is an ethoxylated alcohol also known as $C_{12}$-$C_{14}$ secondary alcohol ethoxylate. While the particular amount of emulsifier used in preparing aqueous silicone emulsions according to the invention is not critical, it should be sufficient to provide an appropriate emulsion droplet size.

The aqueous silicone emulsion is catalyzed by the addition to the silicone base emulsion of an appropriate inorganic acid, organic acid, inorganic base, or organic base, to adjust the pH to acidic or basic, in order to facilitate and/or initiate the crosslinking reaction. For example, an alkali metal hydroxide such as sodium hydroxide or potassium hydroxide, and an amine such as triethanolamine, can be used in adjusting the pH of the silicone base emulsion to a pH of 9 or more. After a brief ripening period, the resulting emulsion containing the silicone elastomer can be neutralized by the addition of an acid such as carboxylic acid or citric acid. Alternatively, the silicone base emulsion can first be brought to a pH of 4 or less by the addition of an acid, and then subsequently neutralized with a base.

Other additives known in the art can be included in the emulsion compositions according to the invention such as siliceous and non-siliceous fillers; adhesion promoters such as organofunctional silanes and hydrolysis products of organofunctional silanes; and biocides. Such additives can be added to the emulsion compositions at any appropriate stage during preparation. The final content of silicones in emulsion compositions of the invention can range from 20-70 weight percent.

Procedurally, the process of making aqueous silicone emulsions that form resin reinforced elastomeric films upon water evaporation, begins by mixing (i) the linear hydroxy terminated polydiorganosiloxane, (ii) the silicone MQ resin, and (iii) the organofunctional polysiloxane, until a homogeneous mixture of the silicone components (i)-(iii) is obtained. If the silicone MQ resin being used is in the form of a solution in an organic solvent such as toluene, however, the resin-in-solvent solution is first mixed with the linear hydroxy terminated polydiorganosiloxane, and subsequently the solvent is stripped to obtain a blend of the silicone MQ resin and the linear hydroxy terminated polydiorganosiloxane.

The blend of (i) and (ii) is then mixed with the organofunctional polysiloxane. Emulsifiers are then added to the mixture of (i)-(iii) and mixed until homogeneous. An initial amount of water, typically 2-20 parts by weight per 100 parts by weight of the silicone mixture of (i)-(iii) is added as a single portion to the mixture containing (i)-(iii) and the emulsifiers, and mixed at a medium to high mixing rate to produce enough shear to invert the emulsion. The remaining water is then added to bring the emulsion to a desired concentration to form the aqueous silicone base emulsion.

The pH of the aqueous silicone base emulsion is adjusted to a pH of 9 or more by adding an appropriate amount of a base compound, for example, such as an alkali metal hydroxide, an amine, or an aqueous solution thereof. The aqueous silicone base emulsion is then kept under agitation for a ripening period, typically a few hours to a day, in order for the crosslinking reaction to occur. Then, a corresponding amount of an acid such as citric acid is added in order to neutralize the emulsion. Alternatively, the aqueous silicone base emulsion can be first brought to a pH of 4 or less with an acid, allowed to ripened, and then neutralized with a base. Ripening at a basic pH is preferred.

A silicone MQ resin reinforced elastomer can be produced by water evaporation of the aqueous silicone base emulsion. Water evaporation can take place under ambient conditions or at an elevated temperature. Typically, a cured elastomeric silicone film can be produced within about 48 hours by drying the ripened aqueous silicone emulsion on a substrate under ambient conditions. The elastomeric silicone film is smooth, it shows good elasticity and strength, and its nature will depend on the particulars of the emulsion composition being dried.

EXAMPLES

The following examples are set forth in order to illustrate the invention in more detail. All parts and percentages are expressed in terms of weight unless otherwise indicated.

Example 1

A linear hydroxy terminated polydimethylsiloxane with a viscosity of 2,000 centistoke (mm$^2$/s) was mixed with a silicone MQ resin solution in toluene, the resin being a silanol-bearing silicone MQ resin with a number average molecular weight of about 4,300, and having the average structure [HO(CH$_3$)$_2$SiO$_{1/2}$]$_{0.2}$[(CH$_3$)$_3$(SiO$_{1/2}$)$_{0.5}$[SiO$_{4/2}$]. The mixture was vacuum distilled at 80° C. to strip and remove the toluene. After stripping, the mixture contained 70 percent by weight of the linear hydroxy terminated polydimethylsiloxane and 30 percent by weight of the silicone MQ resin. A Lightning brand mixer with two radial impellers was used to mix 56.8 gram of the mixture with 10.0 gram of an aminofunctional polysiloxane fluid. The fluid consisted of a C$_{13}$-C$_{15}$ alcohol terminated aminofunctional polydiorganosiloxane having a viscosity of 4,000 centistoke (mm$^2$/s). The fluid contained on average approximately 98 mole percent of dimethylsiloxane units and 2 mole percent of aminoethyl/aminoisobutylmethyl siloxane units. About 80 mole percent of amine hydrogen present in the fluid had been reacted with glycidol, and the fluid contained approximately 11 percent by weight excess C$_{13}$-C$_{15}$ alcohol. About 10.7 gram of nonionic surfactant TERGITOL® TMN-6 and 6.6 gram of pre-warmed TERGITOL® 15-S-40 were added to the mixture and mixed. About 13.3 gram of water was added and mixed at 700 RPM, and a clear gel emulsion was instantly produced. Another portion of 60.0 gram of water was added, mixed at 600 RPM for 30 minutes, and produced a fine bluish white emulsion. The bluish white emulsion was then diluted with another 100 grams of water. About 4.10 gram of a 10 percent by weight aqueous solution of sodium hydroxide was added, and the emulsion was subjected to slow agitation for 24 hours. The next day, 6.13 gram of an aqueous solution of 10 percent by weight of acetic acid was added drop-wise to the aged emulsion and mixed for 30 minutes. The resulting emulsion had an average particle size of 112 nanometer (0.112 micrometer). The emulsion was cast in a plastic Petri dish at room temperature, allowed to dry for 24 hours, and formed a smooth elastomeric film with good strength. The emulsion was stable for more than 6 months.

Example 2

A SpeedMixer™ DAC 150 FVZ (from FlackTek Inc.) was used to mix 5.67 gram of the stripped mixture in Example 1 containing the silicone MQ resin and the linear hydroxy terminated polydiorganosiloxane, with one gram of aminofunctional polysiloxane fluid. The fluid contained 95 percent by weight of the fluid used in Example 1, and about 5 percent by weight of a trimethylsiloxy terminated dimethyl/methyl(glycidoxypropyl)/methyl(propyl)(polyethyleneoxide propyleneoxide)(methyl) polysiloxane having a viscosity of 3,100 centistoke (mm$^2$/s). About 1.07 gram of TERGITOL® TMN-6 and 0.60 gram of pre-warmed TERGITOL® 15-S-40 were added to the mixture and mixed. About 1.33 gram of water was added to the mixture, and the sample was spun at 3,000 RPM for 22 seconds forming clear gel emulsion. Two successive portions of 2.67 gram and then 13.5 gram of water were added to the emulsion and spun. The resulting emulsion was bluish white and contained particles having an average size of 121 nanometer (0.121 micrometer). About 0.33 gram of an aqueous solution of 10 percent by weight of sodium hydroxide was added to the emulsion, and the sample was maintained on a magnetic stirrer for 6 hours. The emulsion was neutralized with 0.5 gram of an aqueous solution of 10 percent by weight of acetic acid. The emulsion was cast in a plastic Petri dish at room temperature, allowed to dry for 24 hours, and formed a smooth elastomeric film with good strength. The film had a softer feel than the film prepared in Example 1.

Example 3

Emulsions D, E, F, G, and H were prepared using the procedure and materials of Example 1 but with varying ratio of PDMS, MQ resin and the aminofunctional polysiloxane (AFS). Emulsion H(b) was emulsion H added with Nalco® 1115 colloidal silica at a level of 10% active colloidal silica per combined weight of PDMS, MQ and AFS before the base emulsion was neutralized with acid. The emulsions were dried under the ambient condition on a Teflon plate and the films were carefully peeled off. Mechanical properties of the films were measured using a Rheometer and an Instron. Table 1 and FIGS. 1 and 2 contain their composition and properties.

TABLE 1

| Emulsion | MQ:PDMS:AFS | Tensile strength, kPa | Elongation at break, % | Modulus at 50%, kPa | $G_N$, kPa |
|---|---|---|---|---|---|
| D | 10/85/5 | 269 ± 13 | 428 ± 20 | 26 ± 3 | 24 |
| E | 18/72/10 | 507 ± 52 | 381 ± 22 | 87 ± 2 | 53 |
| F | 25/60/15 | 471 ± 7 | 527 ± 7 | 56 | 37 |
| G | 34/51/15 | 450 ± 31 | 830 ± 49 | 41 ± 5 | 31 |
| H | 40/40/20 | 365 ± 15 | 985 ± 37 | 18 ± 3 | 13 |
| H(b) | "H" filled with colloidal silica | 1070 ± 10 | 730 ± 15 | 200 ± 11 | 157 |

The silicone MQ resin containing emulsions according to the invention are capable of delivering performance properties such as elasticity, strength, and assist in film formation. Thus, they can be used in coating applications, sealants, and in household, cosmetic and personal care applications, to provide greater durability, protective qualities, water resistance, and barrier properties. It can be used in applications where it is necessary to avoid the use of hydrocarbon-based solvents in delivering the silicone elastomer.

Other variations may be made in compounds, compositions, and methods described herein without departing from the essential features of the invention. The embodiments of the invention specifically illustrated herein are exemplary only and not intended as limitations on their scope except as defined in the appended claims.

The invention claimed is:

1. A method of making an aqueous silicone emulsion containing a crosslinked silicone elastomer comprising mixing;
    (i) 1-95 parts by weight of a linear hydroxy terminated polydiorganosiloxane,
    (ii) 5-60 parts by weight of a silanol containing silicone MQ resin, providing there is at least 40 parts of component (ii) per 100 parts of component (i), and
    (iii) 0.1-30 parts by weight of an organofunctional polysiloxane, to form a water-insoluble homogeneous silicone oil phase; admixing at least one emulsifier and water to the silicone oil phase to obtain an aqueous silicone base emulsion; adding a sufficient amount of an acidic or basic compound to the aqueous silicone base emulsion in order to adjust the pH of the aqueous silicone base emulsion to an acidic or basic pH necessary to facilitate condensation and crosslinking of the linear hydroxy terminated polydiorganosiloxane and the silanol containing silicone MQ resin in forming a crosslinked silicone elastomer; and neutralizing the aqueous silicone emulsion containing the crosslinked silicone elastomer.

2. A method according to claim 1 in which the organofunctional polysiloxane has formula $(R^1_3SiO_{1/2})_a(R^2_2SiO_{2/2})_b(R^3SiO_{3/2})_c$ wherein $R^1$, $R^2$, and $R^3$ are hydrocarbon or organofunctional substituted hydrocarbon groups having 1-18 carbon atoms; provided that at least one organofunctional substituted hydrocarbon group is attached to a silicon atom in the polysiloxane and the organofunctional substituted hydrocarbon group is selected from the group consisting of an amino group, an epoxidized amino group, a quaternary ammonium group, a glycidyl group, a mercapto group, a carboxyl group, a polyoxyethylene oxypropylene group, or combinations thereof; a is 0-100, b is 0-1,000, and c is 0-100, provided that at least two of a-c are not zero and the organofunctional polysiloxane composition is a fluid at room temperature.

3. A method according to claim 1 in which the emulsifier comprises two nonionic surfactants having a combined Hydrophile-Lipophile Balance (HLB) of 11.0-16.0.

4. A method according to claim 1 in which a basic compound is added to the aqueous silicone base emulsion, and the pH is adjusted to a value of 9 or more, to facilitate condensation and crosslinking of the linear hydroxy terminated polydiorganosiloxane and the silanol containing silicone MQ resin in forming the crosslinked silicone elastomer.

5. An aqueous silicone emulsion prepared according to the method defined in claim 1.

6. A method in which the aqueous silicone emulsion in claim 5 is applied to substrate and dried under ambient conditions to an elastomeric silicone film.

* * * * *